United States Patent
Silverbrook et al.

(10) Patent No.: US 7,468,807 B2
(45) Date of Patent: *Dec. 23, 2008

(54) MODULAR PRINTER EFFECTS MODULE WITH A TRIPLET OF ACTUATORS

(75) Inventors: Kia Silverbrook, Balmain (AU); Simon Robert Walmsley, Balmain (AU); Paul Lapstun, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 0 days.

This patent is subject to a terminal disclaimer.

(21) Appl. No.: 11/845,666

(22) Filed: Aug. 27, 2007

(65) Prior Publication Data

US 2007/0291310 A1 Dec. 20, 2007

Related U.S. Application Data

(60) Continuation of application No. 10/636,232, filed on Aug. 8, 2003, now Pat. No. 7,274,485, which is a division of application No. 09/575,134, filed on May 23, 2000, now Pat. No. 6,967,741.

(51) Int. Cl.
*G06F 15/00* (2006.01)
*G06F 3/12* (2006.01)
(52) U.S. Cl. ........................ 358/1.18; 358/1.1
(58) Field of Classification Search .................. 358/1.5, 358/1.8, 1.9, 1.13, 1.16, 1.18, 472, 473; 382/313, 382/314; 348/231.6; 385/92
See application file for complete search history.

(56) References Cited

U.S. PATENT DOCUMENTS

| | | | |
|---|---|---|---|
| 4,990,005 A * | 2/1991 | Karakawa | 400/76 |
| 5,432,896 A | 7/1995 | Hwong et al. | |
| 5,477,264 A | 12/1995 | Sarbadhikari et al. | |
| 5,586,207 A | 12/1996 | Goodwin | |
| 5,591,192 A | 1/1997 | Privitera et al. | |
| 5,748,326 A | 5/1998 | Thompson-Bell et al. | |
| 5,784,434 A | 7/1998 | Shieh | |
| 6,529,287 B1 | 3/2003 | Wang et al. | |
| 6,760,164 B2 | 7/2004 | Togino | |
| 6,967,741 B1 * | 11/2005 | Silverbrook et al. | 358/1.18 |
| 7,274,455 B2 * | 9/2007 | Ok et al. | 356/417 |
| 2004/0006256 A1 | 1/2004 | Suzuki et al. | |

FOREIGN PATENT DOCUMENTS

| | | |
|---|---|---|
| AU | 55415/98 A | 8/1998 |
| EP | 924647 A2 | 6/1999 |
| GB | 2327838 A | 2/1999 |
| WO | WO 98/30021 A | 7/1998 |

* cited by examiner

*Primary Examiner*—Gabriel I Garcia

(57) ABSTRACT

An effects module is provided for a modular printer. The effects module includes a body, in turn, housing electronics. A CHOOSE actuator is mounted to the body in electrical connection with the electronics and enables a user to choose between a number of different types of effects to be applied to a stored image. A SELECT actuator is mounted to the body in electrical connection with the electronics and enables the user to select one of the effects. An APPLY actuator is mounted to the body in electrical connection with the electronics and enables the user to apply the effect to the stored image.

7 Claims, 12 Drawing Sheets

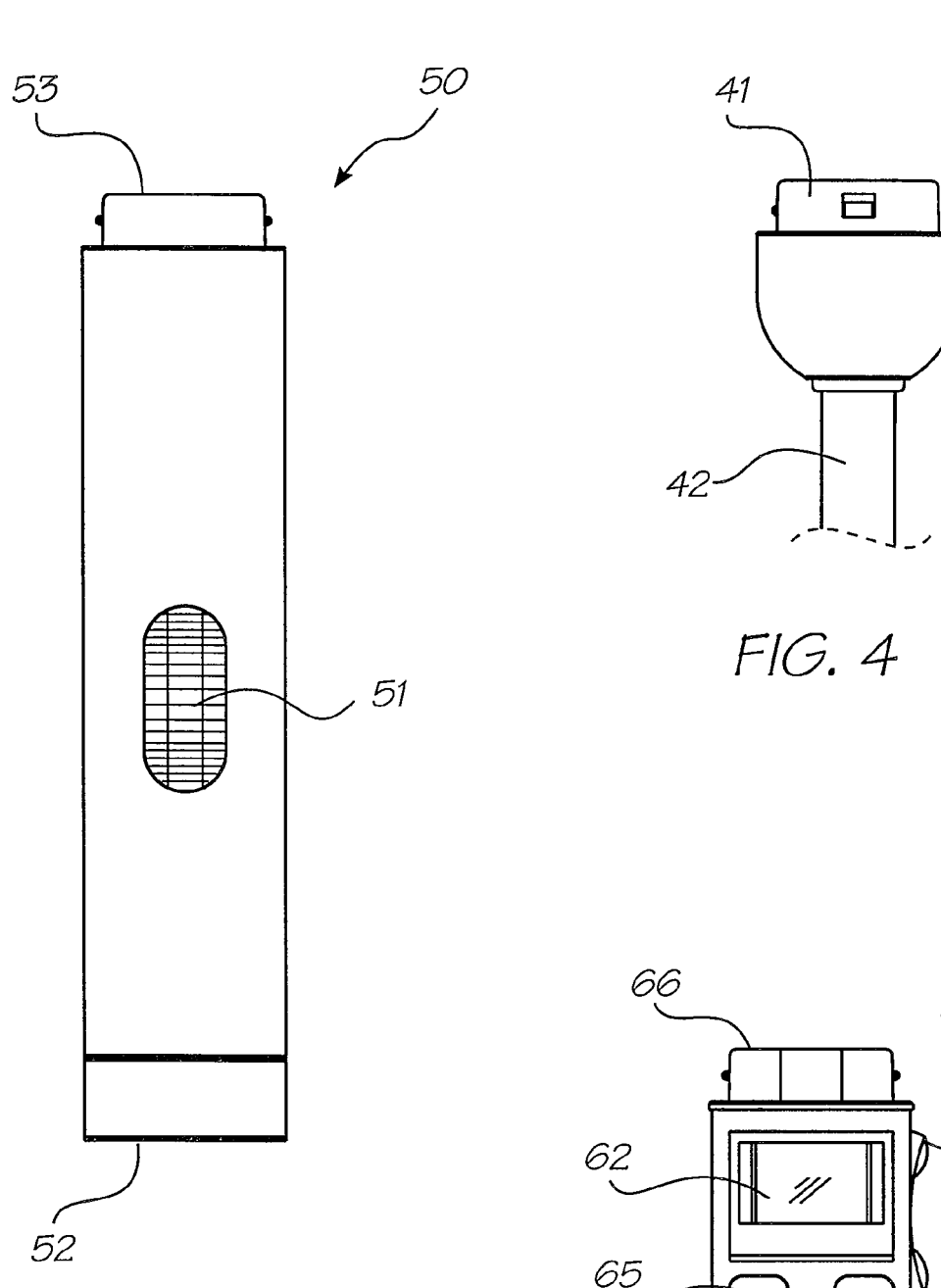

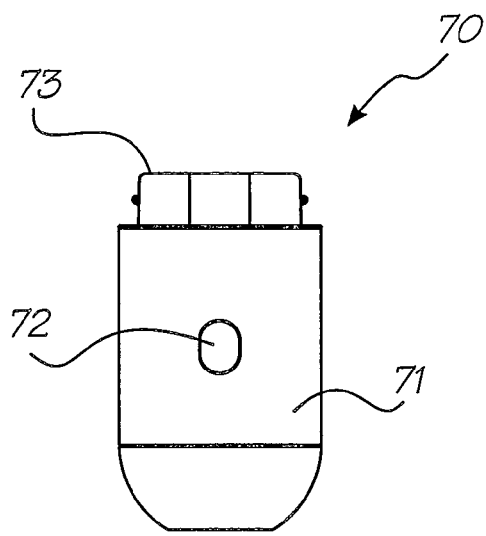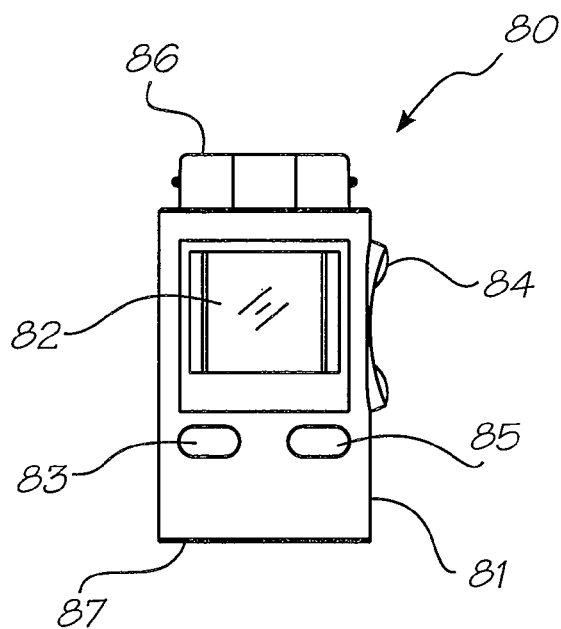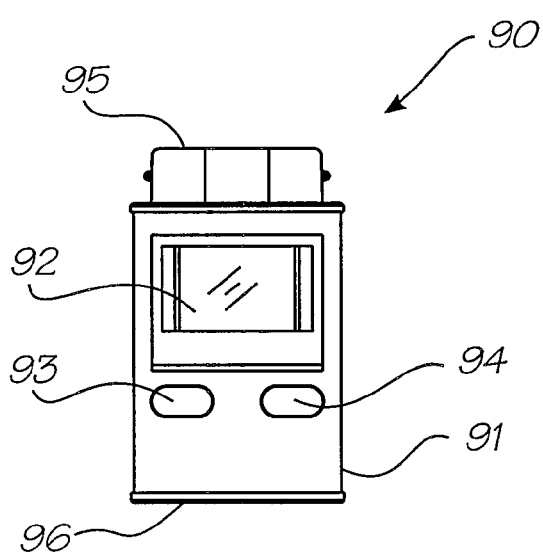

MODULAR PRINTER EFFECTS MODULE WITH A TRIPLET OF ACTUATORS

CROSS REFERENCE TO RELATED APPLICATIONS

This is a Continuation application of U.S. application Ser. No. 10/636,232 filed on Aug. 8, 2003, which is a Divisional of U.S. application Ser. No. 09/575,134 filed on May 23, 2000 now issued U.S. Pat. No. 6,967,741 all of which are herein incorporated by reference.

FIELD OF THE INVENTION

The invention relates to an effects module useful in a digital imaging system. It is useful for applying effects to images prior to printing in a compact printer system able to print full-color, business card size documents from a device about the size of a pen.

Reference may be had to co-pending applications claiming priority from Australian Provisional Patent Application number PQ0560 dated 25 May 1999. The co-pending applications describe related modules and methods for implementing the compact printer system. The co-pending applications are as follows:

| USSN | Title |
| --- | --- |
| 6238043 | Ink Cartridge for Compact Printer System |
| 6416160 | Nozzle Capping Mechanism |
| 6553459 | Memory Module for Compact Printer System |
| 6712452 | Modular Compact Printer System |
| 6804026 | Color Conversion Method for Compact Printer System |
| 6812972 | Camera Module for Compact Printer System |
| 6903766 | Timer Module for Compact Printer System |
| 6924907 | Compact Color Printer Module |
| 6956669 | Effects Processor for Effects Module |
| 6958826 | Controller for Printer Module |
| 6975429 | Method and Apparatus of Image Conversion |
| 09/575120 | Method and Apparatus of Dithering |

BACKGROUND OF THE INVENTION

Microelectronic manufacturing techniques have led to the miniaturization of numerous devices. Mobile phones, personal digital assistant devices, and digital cameras are very common examples of the miniaturization trend.

One device that has not seen the advantage of microelectronic manufacturing techniques is the printer. Commercially available printers are large compared to many of the devices they could support. For instance, it is impractical to carry a color printer for the purpose of instantly printing photographs taken with known compact digital cameras.

A compact printhead has been described in co-pending United States patent applications filed simultaneously to the present application and hereby incorporated by cross reference:

| USSN | Title |
| --- | --- |
| 6428133 | Ink Jet Printhead Having a Moving Nozzle with an Externally Arranged Actuator |
| 6526658 | Method of Manufacture of an Ink Jet Printhead Having a Moving Nozzle with an Externally Arranged Actuator |
| 6390591 | Nozzle Guard for an Ink jet Printhead |
| 7018016 | Fluidic seal for an ink jet nozzle assembly |
| 6328417 | Ink Jet Printhead Nozzle Array |

It is known in some compact devices such as cameras to provide on-board processing to apply effects such as labels, for example the time and date. It is even known to have facility to produce custom labels, although these are normally only simple text. The problem with these known devices is that they are very limited in the range of effects provided. Furthermore, they are built in to the device and are therefore fixed. A more versatile approach to memory devices is desirable.

SUMMARY OF THE INVENTION

1. In one form, the invention resides in an effects module for applying one or more effects to a stored image comprising:
   a body and within said body;
   a select mechanism for retrieving the stored image from a first image store;
   an image processor for applying said one or more effects to said stored image;
   a transfer mechanism for transferring a resultant image to a second image store;
   a LCD being connected to said image processor and providing information about said effects; and.
   at least one connection means incorporated in said body for connecting said effects module to a bus providing power and data between said effects module and said stored image.

Further features of the invention will be evident from the following description.

BRIEF DESCRIPTION OF THE DRAWINGS

In order to assist with describing preferred embodiments of the invention, reference will be made to the following figures in which:

FIG. 4 is a communication module;
FIG. 5 is a flash module;
FIG. 6 is a timer module;
FIG. 7 is a laser module;
FIG. 8 is an effects module;
FIG. 9 is a characters module.

DETAILED DESCRIPTION OF THE PREFERRED EMBODIMENTS

The invention is described in terms of the application to a compact printer system. It will be understood that the invention is not limited to this particular application but rather can be employed with any digital imaging system. Nonetheless, the compact printer system provides a convenient environment in which to describe the details of the effects module invention.

Referring to FIGS. 1 to 12, there are shown various modules that together form a compact printer system. Individual modules can be attached and detached from the compact printer configuration to allow a user-definable solution to business-card sized printing. Images can also be transferred from one compact printer to another without the use of a secondary computer system. Modules have a minimal user-interface to allow straightforward interaction.

A compact printer system configuration consists of a number of compact printer modules connected together. Each compact printer module has a function that contributes to the overall functionality of the particular compact printer configuration. Each compact printer module is typically shaped like part of a pen, physically connecting with other compact printer modules to form the complete pen-shaped device. The length of the compact printer device depends on the number and type of compact printer modules connected. The functionality of a compact printer configuration depends on the compact printer modules in the given configuration.

The compact printer modules connect both physically and logically. The physical connection allows modules to be connected in any order, and the logical connection is taken care of by the compact printer Serial Bus—a bus that provides power, allows the modules to self configure and provides for the transfer of data.

In terms of physical connection, most compact printer modules consist of a central body, a male connector at one end, and a female connector at the other. Since most modules have both a male and female connector, the modules can typically be connected in any order. Certain modules only have a male or a female connector, but this is determined by the function of the module. Adaptor modules allow these single-connector modules to be connected at either end of a given compact printer configuration.

A four wire physical connection between all the compact printer modules provides the logical connection between them in the form of the compact printer Serial Bus. The compact printer Serial Bus provides power to each module, and provides the means by which data is transferred between modules. Importantly, the compact printer Serial Bus and accompanying protocol provides the means by which the compact printer system auto-configures, reducing the user-interface burden on the end-user.

Figure 2:
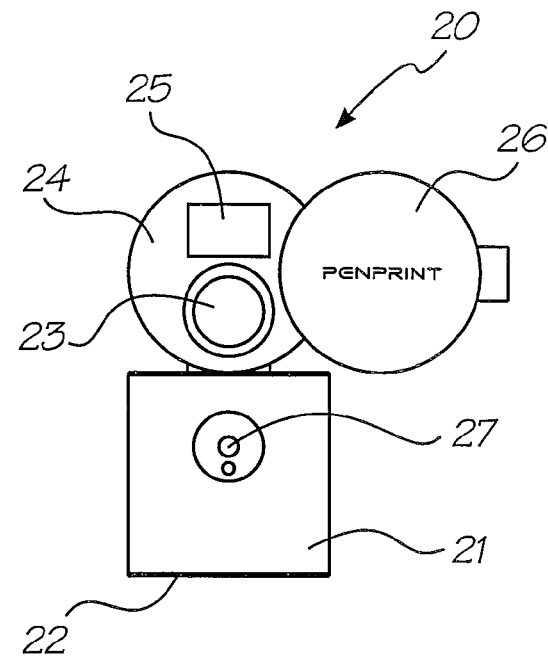
FIG. 2 is a camera module.
Figure 3:
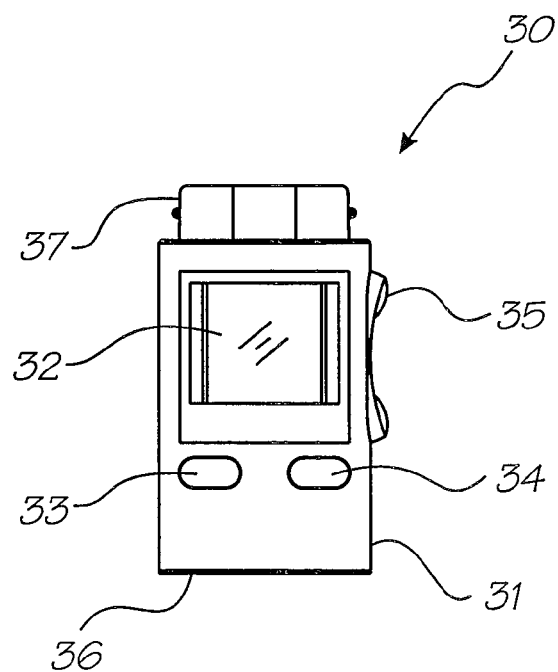
FIG. 3 is a memory module.

Compact printer modules can be grouped into three types:
- image processing modules including a Printer Module (FIG. 1), a Camera Module (FIG. 2), and a Memory Module (FIG. 3). Image processing modules are primarily what sets the compact printer system apart from other pen-like devices. Image processing modules capture, print, store or manipulate photographic images;
- housekeeping modules including an Adapter Module (FIG. 10), an Effects Module (FIG. 8), a Communications Module (FIG. 4), and a Timer Module (FIG. 6). Housekeeping modules provide services to other modules or extended functionality to other modules; and
- isolated modules including a Pen Module (FIG. 11) and a Laser Module (FIG. 7). Isolated modules are those that attach to the compact printer system but are completely independent of any other module. They do not necessarily require power, and may even provide their own power. Isolated Modules are defined because the functionality they provide is typically incorporated into other pen-like devices.

Although housekeeping modules and isolated modules are useful components in a compact printer system, they are extras in a system dedicated to image processing and photographic manipulation. Life size (1:1) illustrations of the compact printer modules are shown in FIGS. 1 to 12, and example configurations produced by connecting various modules together are shown in FIGS. 13 to 16.

Figure 1:
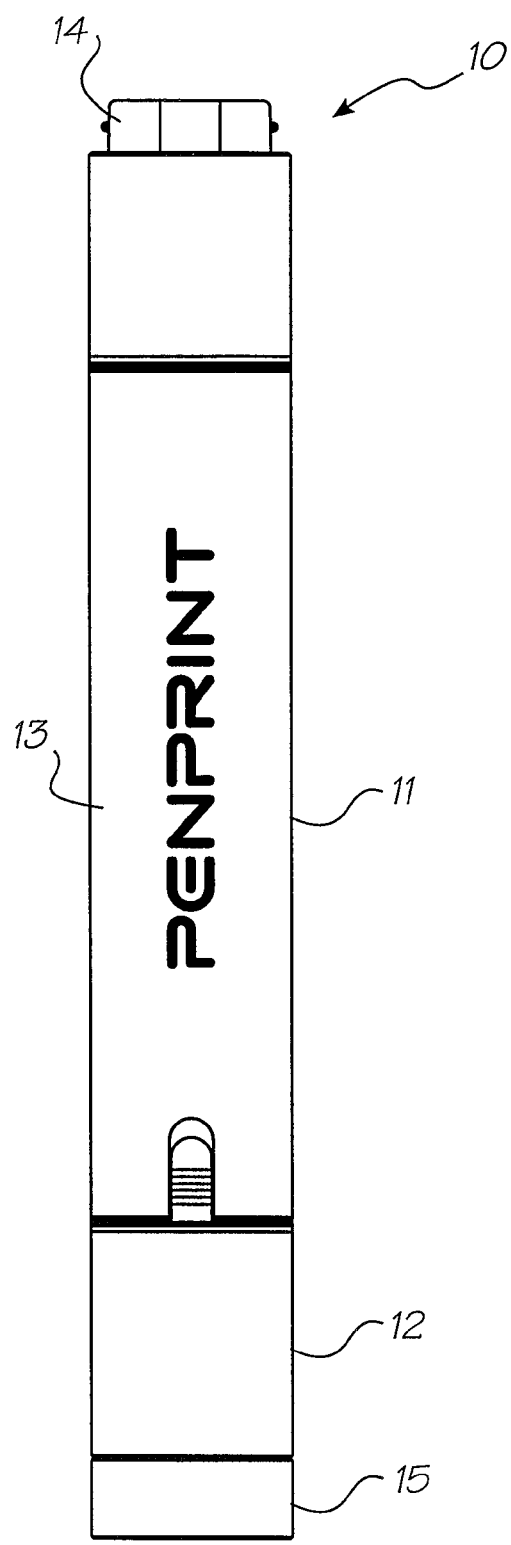
FIG. 1 is a printer module.

FIG. 1 shows a printer module that incorporates a compact printhead described in co-pending United States patent applications listed in the Background section of this application, incorporated herewith by reference, and referred to herewith as a Memjet printhead. The Memjet printhead is a drop-on-demand 1600 dpi inkjet printer that produces bi-level dots in up to 4 colors to produce a printed page of a particular width. Since the printhead prints dots at 1600 dpi, each dot is approximately 22.5 μm in diameter, and spaced 15.875 μm apart. Because the printing is bi-level, the input image should be dithered or error-diffused for best results. Typically a Memjet printhead for a particular application is page-width. This enables the printhead to be stationary and allows the paper to move past the printhead. A Memjet printhead is composed of a number of identical ½ inch Memjet segments.

The printer module 10 comprises a body 11 housing the Memjet printhead. Power is supplied by a three volt battery housed in battery compartment 12. The printhead is activated to commence printing when a business card (or similar sized printable media) is inserted into slot 13. Male connector 14 and female connector 15 facilitate connection of other modules to the printer module 10.

FIG. 2 shows a camera module 20. The camera module provides a point-and-shoot camera component to the compact printer system as a means of capturing images. The camera module comprises a body 21 having a female connector 22. A lens 23 directs an image to an image sensor and specialized image processing chip within the camera 24. A conventional view finder 25 is provided as well as a lens cap 26. An image is captured when the Take button 27 is pushed. Captured images are transferred to the Printer Module 10 for subsequent printing, manipulation, or storage. The Camera Module also contains a self-timer mode similar to that found on regular cameras.

FIG. 3 shows a Memory Module 30 comprising a body 31, LCD 32, IN button 33, OUT button 34 and SELECT button 35. The Memory Module 30 is a standard module used for storing photographic images captured by the Camera 20. The memory module stores 48 images, each of which can be accessed either at full resolution or at thumbnail resolution. Full resolution provides read and write access to individual images, and thumbnail resolution provides read access to 16 images at once in thumbnail form.

The Memory Module 30 attaches to other modules via a female connector 36 or male connector 37. The male and female connectors allow the module to be connected at either end of a configuration. Power may be provided from the Printer Module 10 via the Serial Bus or from a separate power source, such as a power module.

A Communications module 40 is shown in FIG. 4. The communications module 40 consists of a connector 41 and a cable 42 that terminates in an appropriate connector for a computer port, such as a USB port, RS232 serial port or parallel port. The Communications Module 40 allows the compact printer system to be connected to a computer. When so connected, images can be transferred between the computer and the various modules of the compact printer system. The communications module allows captured images to be downloaded to the computer, and new images for printing to be uploaded into the printer module 10 and the memory module 30.

A Flash Module 50 is shown in FIG. 5. The Flash Module 50 is used to generate a flash with flash cell 51 when taking photographs with the Camera Module 20. The Flash Module attaches to other modules via female connector 52 and male connector 53. It contains its own power source. The Flash Module is automatically selected by the Camera Module when required. A simple switch allows the Flash Module to be explicitly turned off to maximize battery life.

FIG. 6 shows a Timer Module 60 that is used to automate the taking of multiple photos with the Camera Module 20, each photo separated by a specific time interval. The captured photos are stored in Memory Module 30. Any flash requirements are handled by the Camera Module 20, and can therefore be ignored by the Timer Module. The Timer Module 60 consists of a body 61 housing a LCD 62, START/STOP button 63 and UNITS button 64. A SELECT button 65 allows the user to select time units and the number of units are set by UNITS button 64. The Timer Module 60 includes a male connector 66 and female connector 67. The Timer Module takes its power from the Printer Module 10 via the Serial Bus or from a separate power source, such as a power module.

A Laser Module 70 is shown in FIG. 7. The Laser Module 70 consists of a body 71 containing a conventional laser pointer operated by button 72. As the Laser Module is a terminal module it only has one connector, which in the example is a male connector 73. The Laser Module is an isolated module, in that it does not perform any image capture, storage, or processing. It exists as a functional addition to the compact printer system. It is provided because laser pointer services are typically incorporated into other pen-like devices. The Laser Module contains its own power supply and does not appear as a device on the Serial Bus.

The Effects Module shown in FIG. 8 is an image processing module. It allows a user to select a number of effects and applies them to the current image stored in the Printer Module 10 or other module having an image store. The effects include borders, clip-art, captions, warps, color changes, and painting styles. The Effects Module comprises a body 81 housing custom electronics and an optional LCD 82. The LCD is optional as data from the Effects Module can be transferred to another module for display. A CHOOSE button 83 allows a user to choose between a number of different types of effects. A SELECT button 84 allows the user to select one effect from the number of effects of the chosen type. Pressing the APPLY button 85 applies the effect to an image stored in memory in the Printer Module 10, the Memory Module 30 or any other module that stores an image. The Effects Module obtains power from the Serial Bus. Male connector 86 and female connector 87 allow the Effects Module to be connected to other compact printer system modules.

FIG. 9 shows a Character Module 90 that is a special type of Effects Module (described above) that only contains character clip-art effects of a given topic or genre. Examples include The Simpsons®, Star Wars®, Batman®, and Dilbert® as well as company specific modules for McDonalds® etc. As such it is an image processing module. It consists of a body 91 housing custom electronics and a LCD 92. SELECT button 93 allows the user to choose the effect that is to be applied with APPLY button 94. The Character Module obtains power from the Serial Bus through male connector 95 and female connector 96.

Figure 10:
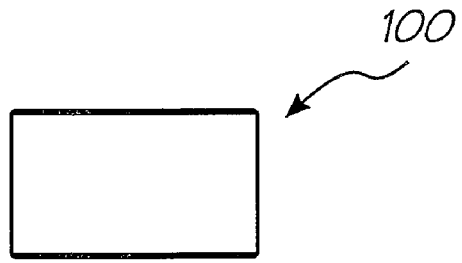
FIG. 10 is an adaptor module.

The Adaptor Module 100, shown in FIG. 10, is a female/female connector that allows connection between two modules that terminate in male connectors. A male/male connector (not shown) allows connection between two modules that terminate in female connectors. The Adaptor Module is a housekeeping module, in that it facilitates the use of other modules, and does not perform any specific processing of its own.

All "through" modules have a male connector at one end, and a female connector at the other end. The modules can therefore be chained together, with each module connected at either end of the chain. However some modules, such as the Laser Module 70, are terminating modules, and therefore have either a male or female connector only. Such single-connector modules can only be connected at one end of the chain. If two such modules are to be connected at the one time, an Adaptor Module 100 is required.

Figure 11:
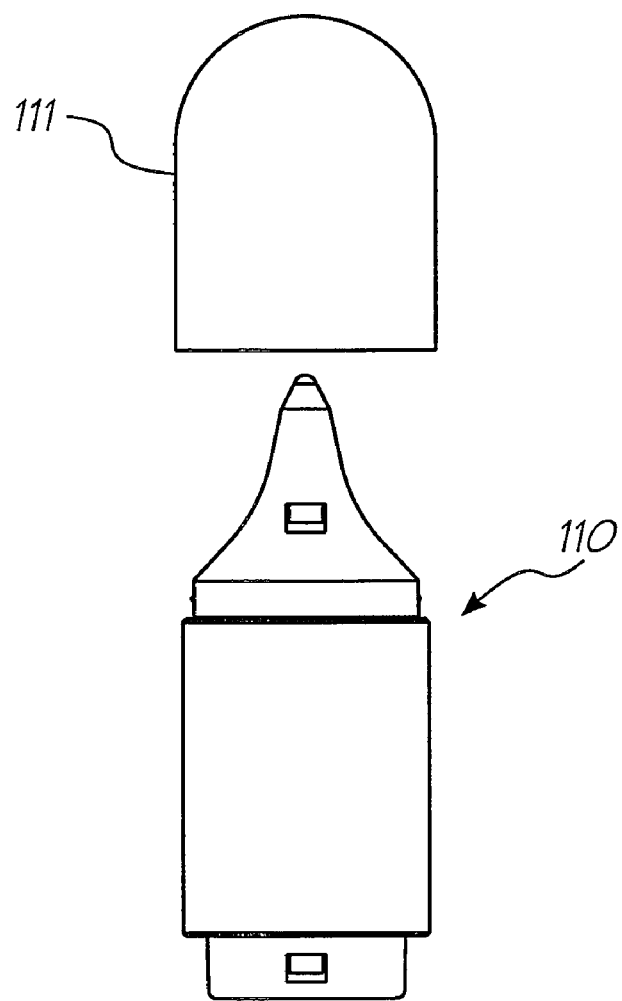
FIG. 11 is a pen module.

FIG. 11 shows a Pen Module 110 which is a pen in a module form. It is an isolated module in that it attaches to the compact printer system but is completely independent of any other module. It does not consume or require any power. The Pen Module is defined because it is a convenient extension of a pen shaped, pen sized device. It may also come with a cap 111. The cap may be used to keep terminating connectors clean in the case where the chain ends with a connector rather than a terminating module.

Figure 12:
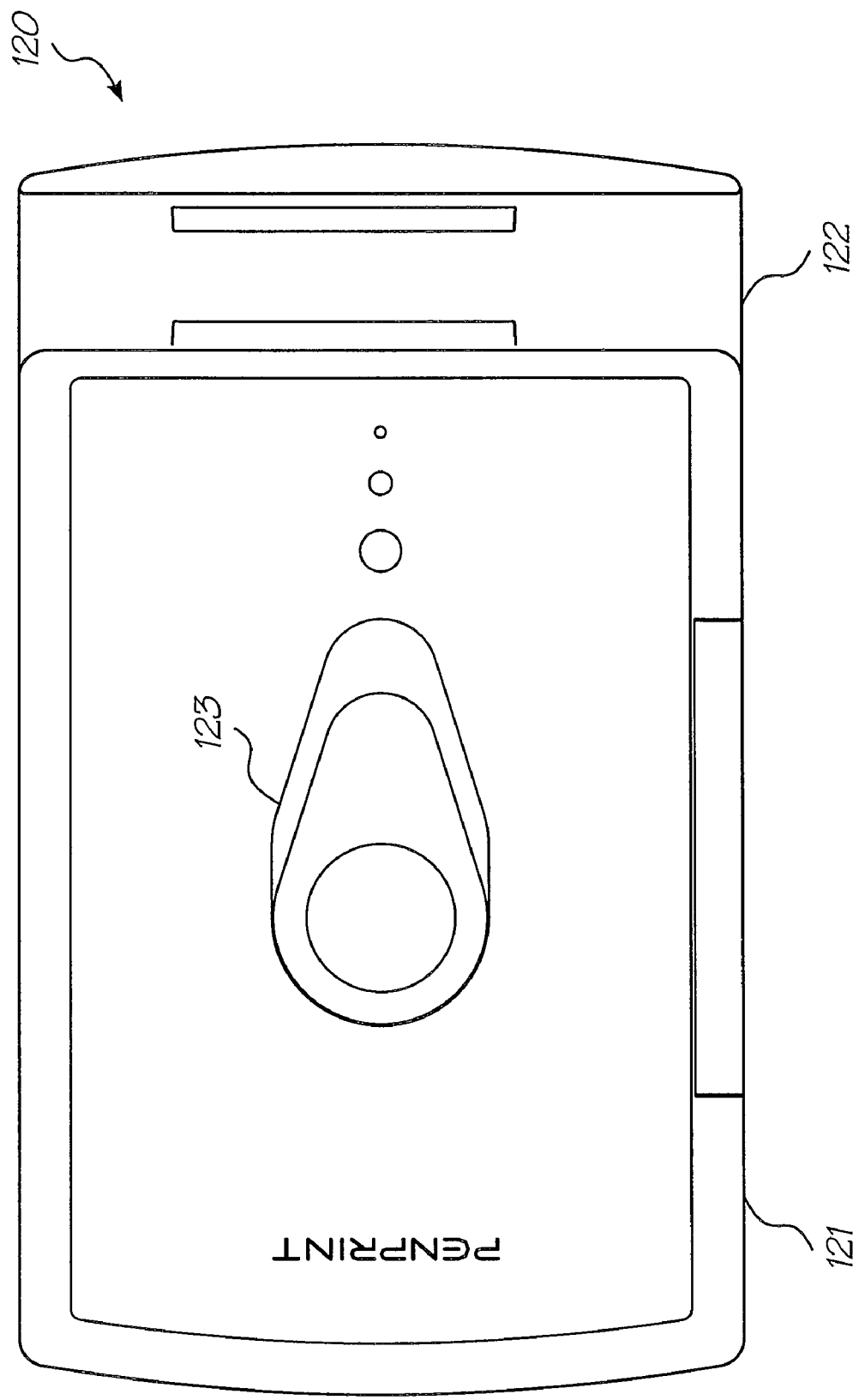
FIG. 12 is a dispenser module.

To assist with accurately feeding a business card sized print media into slot 13 of the printer module 10, a dispenser module 120 is provided as shown in FIG. 12. The dispenser module 120 comprises a body 121 that holds a store of business card sized print media. A Printer Module 10 locates into socket 122 on the dispenser module 120. When correctly aligned, a card dispensed from the dispenser module by slider 123 enters slot 13 and is printed.

In the sense that a minimum configuration compact printer system must be able to print out photos, a minimum compact printer configuration contains at least a Printer Module 10. The Printer Module holds a single photographic image that can be printed out via its Memjet printer. It also contains the 3V battery required to power the compact printer system.

Figure 13:
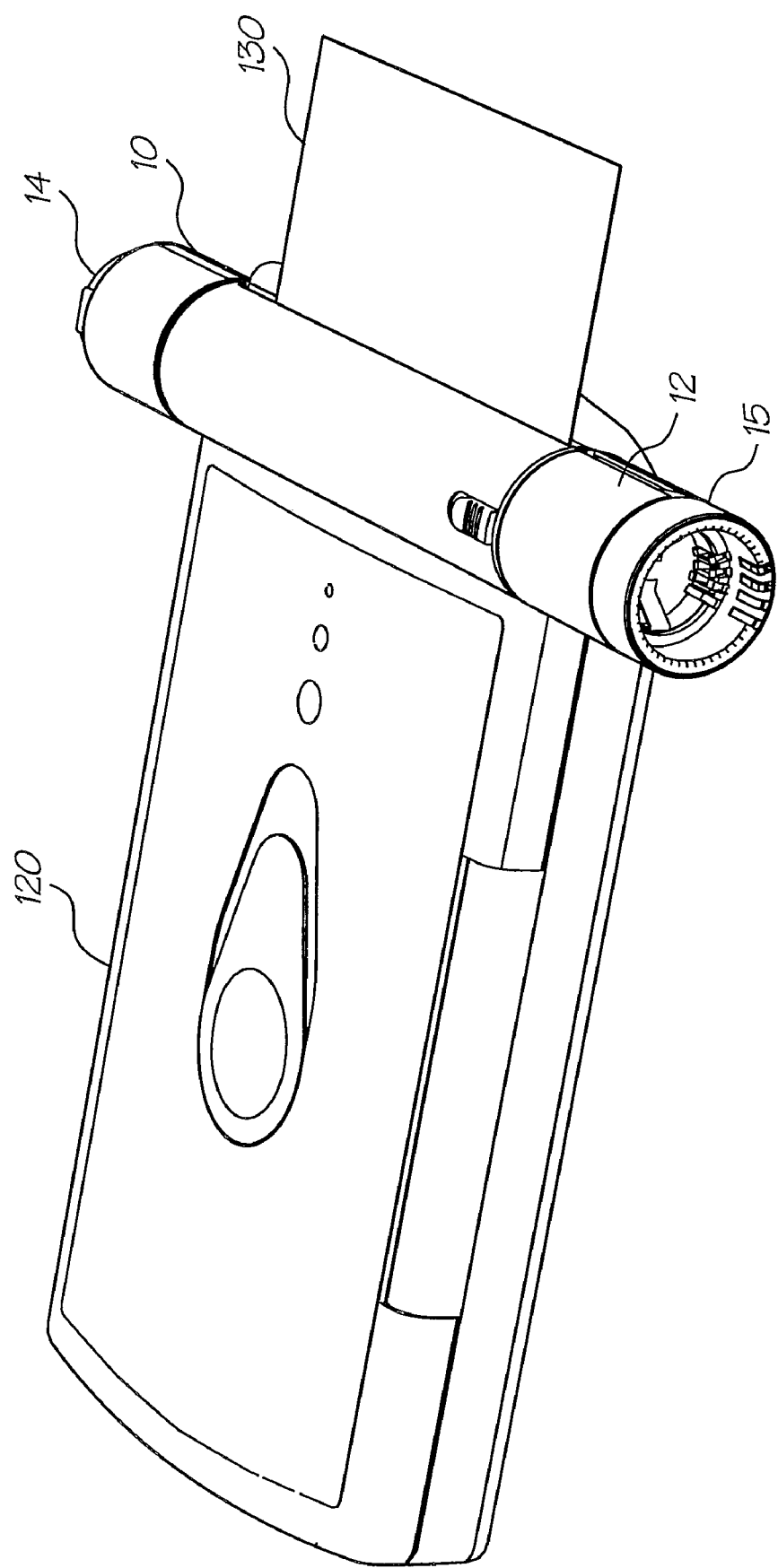
FIG. 13 is a first compact printer configuration.

In this minimum configuration, the user is only able to print out photos. Each time a user inserts a business card 130 into the slot in the Printer Module, the image in the Printer Module is printed onto the card. The same image is printed each time a business card is inserted into the printer. In this minimum configuration there is no way for a user to change the image that is printed. The dispenser module 120 can be used to feed cards 130 into the Printer Module with a minimum of fuss, as shown in FIG. 13.

Figure 14:
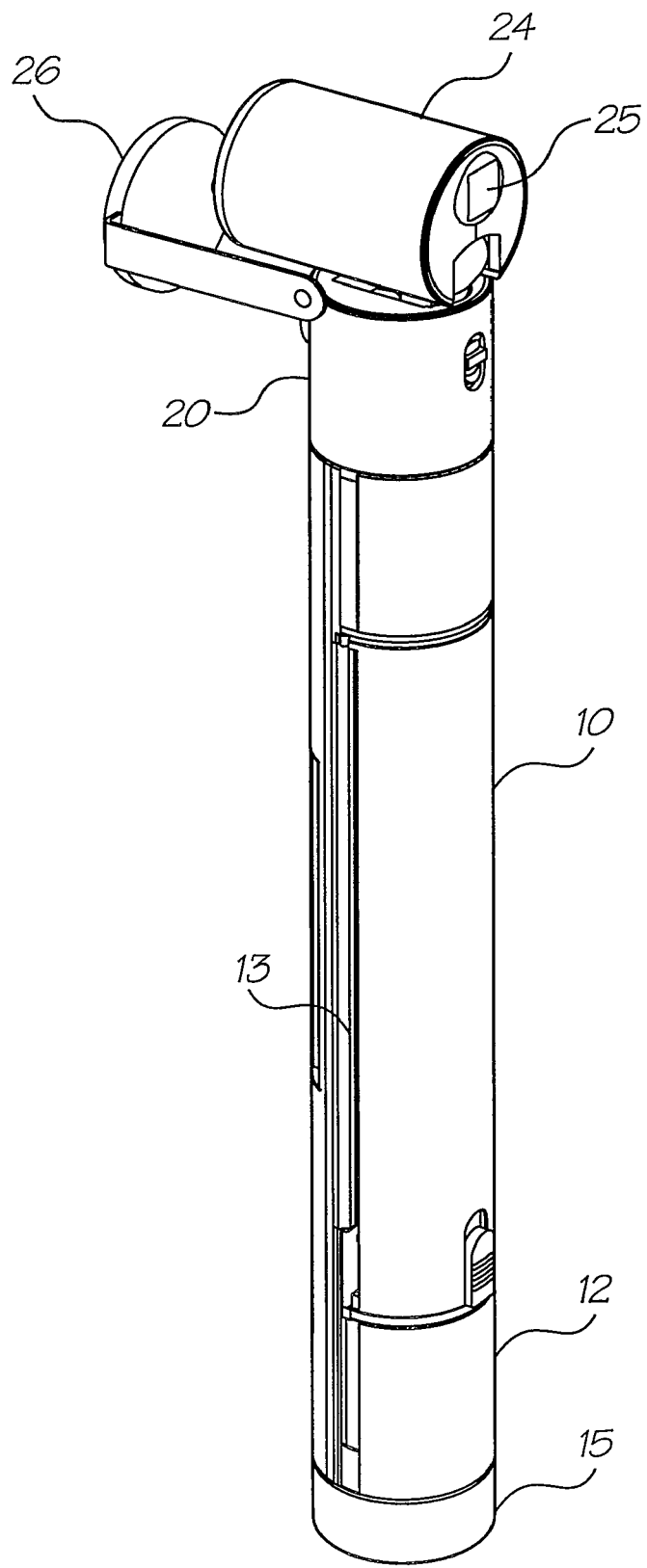
FIG. 14 is a second compact printer configuration.

By connecting a Camera Module 20 to the minimum configuration compact printer system the user now has an instant printing digital camera in a pen, as shown in FIG. 14. The Camera Module 20 provides the mechanism for capturing images and the Printer Module 10 provides the mechanism for printing them out. The battery in the Printer Module provides power for both the camera and the printer.

When the user presses the "Take" button 27 on the Camera Module 20, the image is captured by the camera 24 and transferred to the Printer Module 10. Each time a business card is inserted into the printer the captured image is printed out. If the user presses "Take" on the Camera Module again, the old image in the Printer Module is replaced by the new image.

If the Camera Module is subsequently detached from the compact printer system, the captured image remains in the Printer Module, and can be printed out as many times as desired. The Camera Module is simply there to capture images to be placed in the Printer Module.

Figure 15:
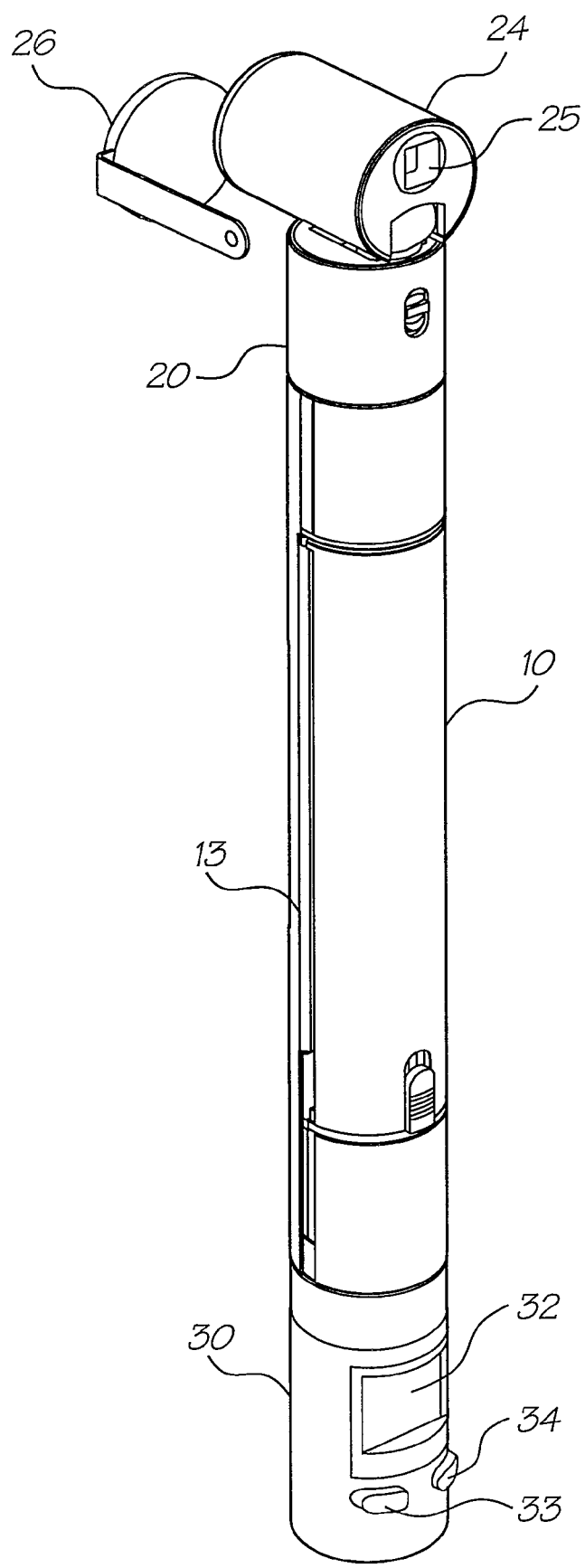
FIG. 15 is a third compact printer configuration.

FIG. 15 shows a further configuration in which a Memory Module 30 is connected to the configuration of FIG. 14. In the embodiment of FIG. 15, the user has the ability to transfer images between the Printer Module 10 and a storage area contained in the Memory Module 30. The user selects the image number on the Memory Module, and then either sends that image to the Printer Module (replacing whatever image was already stored there), or brings the current image from the Printer Module to the specified image number in the Memory Module. The Memory Module also provides a way of sending sets of thumbnail images to the Printer Module.

Multiple Memory Modules can be included in a given system, extending the number of images that can be stored. A given Memory Module can be disconnected from one compact printer system and connected to another for subsequent image printing.

With the Camera Module 20 attached to a Memory Module/Printer Module compact printer system, as shown in FIG. 15, the user can "Take" an image with the Camera Module, then transfer it to the specified image number in the Memory Module. The captured images can then be printed out in any order.

Figure 16:
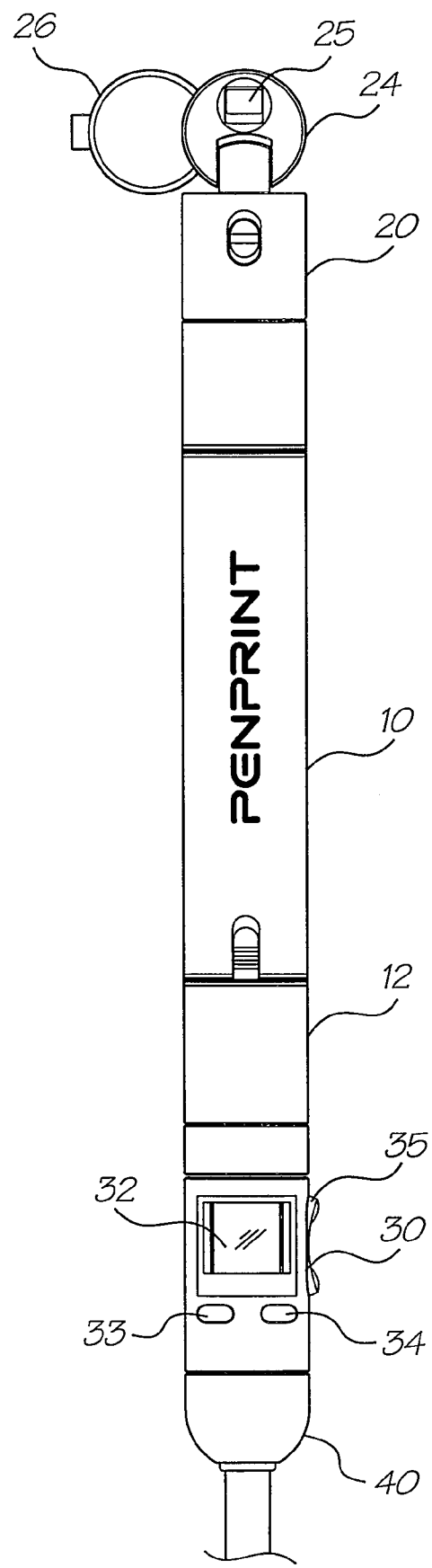
FIG. 16 is a fourth compact printer configuration.

By connecting a Communications Module 40 to the minimum configuration compact printer system, the user gains the ability to transfer images between a PC and the compact printer system. FIG. 16 shows the configuration of FIG. 15 with the addition of a Communications Module 40. The Communications Module makes the Printer Module 10 and any Memory Modules 30 visible to an external computer system. This allows the download or uploading of images. The communications module also allows computer control of any connected compact printer modules, such as the Camera Module 20.

Each module is visible on the Serial Bus. Each module is self identifying and self-configuring using standard USB protocols. Apart from the standard protocol functions (including identification), there are a number of functions to which each module is also capable of responding. These are outlined in Table 1. Each module also has a number of module-specific functions. These commends allow the modules to be controlled by an external device, such as a personal computer, and by other modules.

TABLE 1

Basic Module Functions

| Name | Description |
|---|---|
| GetImageCounts( ) | Returns two counts - the number of images that can be read from the module, and the number of images that can be written to the module. This allows read only, write only, and virtual read only images. |
| GetCurrentImageNumber | If the module has a setting for the image number, this call returns the current image number. |
| GetImageAccessMethods | Returns two sets of 8 access bits. The first set represents the read access bits, and the second set represents the write access bits. See Table 2 for an interpretation of the bits. |
| GetImage(N, Mode) | Returns image number N using the specified 8-bit access mode. See Table 3 for an interpretation of the access mode bits. |

TABLE 1-continued

Basic Module Functions

| Name | Description |
|---|---|
| StoreImage(N, Mode) | Stores an image at address N using the specified 8-bit access mode. See Table 3 for an interpretation of the access mode bits. |
| TransferImage(N1, Mode, Dest, N2) | Transfers the image at address N1 using the specified 8-bit access mode to the image at address N2 at the serial device with id Dest. See Table 3 for an interpretation of the access mode bits. |

The 8-bit mode returned by GetImageAccessMethods is interpreted as follows:

TABLE 2

8-bit return code from GetImageAccessMethods

| Bit | Interpretation |
|---|---|
| 0 | Access 850 × 534 permitted |
| 1 | Access 534 × 850 permitted |
| 2 | Interleaved L*a*b* permitted |
| 3 | Planar L*, a*, b* permitted |
| 4-7 | Reserved, and 0 |

The 8-bit mode used for image read and write access via GetImage, StoreImage and TransferImage is interpreted as follows:

TABLE 3

8-bit code used for read & write access

| Bit | Interpretation |
|---|---|
| 0 | Orientation: 0 = 850 × 534, 1 = 534 × 850 |
| 1 | 0 = interleaved, 1 = planar |
| 2-3 | Color plane (valid only when bit 1 = planar) 00 = L*, 01 = a*, 10 = b*, 11 = reserved |
| 4-7 | Reserved, and 0 |

In some situations, certain modules may be configured without the printer module. For example, it may be convenient to configure a camera module 20 and a memory module 30 for capturing and storing images for later printing by the printer module 10. The timer module 60 and the flash module 50 may be added to the camera module 20 and memory module 30 to produce a digital camera having many of the features of a conventional camera. Additional memory modules can easily be added to provide virtually unlimited memory storage. An Effects Module may be added to apply effects to stored images for later printing.

The above commands allow images to be transferred to and from the modules without going through the printer module. For example, the Memory Module 30 can act under control of the Timer Module 60 to transfer a captured image from the Camera Module 20 to the Memory Module 30 using the TransferImage command. The Camera Module 20 will have a module specific 'capture' command for capturing an image. The Effects Module will have module specific commands for applying selected effects to an image.

In the general case, the Printer Module holds the "current" image, and the other modules function with respect to this central repository of the current image. The Printer Module is therefore the central location for image interchange in the compact printer system, and the Printer Module provides a service to other modules as specified by user interaction.

A given module may act as an image source. It therefore has the ability to transfer an image to the Printer Module. A different module may act as an image store. It therefore has the ability to read the image from the Printer Module. Some modules act as both image store and image source. These modules can both read images from and write images to the Printer Module's current image.

The standard image type has a single conceptual definition. The image definition is derived from the physical attributes of the printhead used in the Printer Module. The printhead is 2 inches wide and prints at 1600 dpi in cyan, magenta and yellow bi-level dots. Consequently a printed image from the compact printer system is 3200 bi-level dots wide.

The compact printer system prints on business card sized pages (85 mm×55 mm). Since the printhead is 2 inches wide, the business cards are printed such that 1 line of dots is 2 inches. 2 inches is 50.8 mm, leaving a 2 mm edge on a standard business-card sized page. The length of the image is derived from the same card size with a 2 mm edge. Consequently the printed image length is 81 mm, which equals 5100 1600 dpi dots. The printed area of a page is therefore 81 mm×51 mm, or 5100×3200 dots.

To obtain an integral contone to bi-level ratio a contone resolution of 267 ppi (pixels per inch) is chosen. This yields a contone CMY page size of 850×534, and a contone to bi-level ratio of 1:6 in each dimension. This ratio of 1:6 provides no perceived loss of quality since the output image is bi-level.

The printhead prints dots in cyan, magenta, and yellow ink. The final output to the printed page must therefore be in the gamut of the printhead and take the attributes of the inks into account. It would at first seem reasonable to use the CMY color space to represent images. However, the printer's CMY color space does not have a linear response. This is definitely true of pigmented inks, and partially true for dye-based inks. The individual color profile of a particular device (input and output) can vary considerably. Image capture devices (such as digital cameras) typically work in RGB (red green blue) color space, and each sensor will have its own color response characteristics.

Consequently, to allow for accurate conversion, as well as to allow for future image sensors, inks, and printers, the CIE L*a*b* color model [CIE, 1986, CIE 15.2 Colorimetry: Technical Report ($2^{nd}$ Edition), Commission Internationale De l'Eclairage] is used for the compact printer system. L*a*b* is well defined, perceptually linear, and is a superset of other traditional color spaces (such as CMY, RGB, and HSV).

The Printer Module must therefore be capable of converting L*a*b* images to the particular peculiarities of its CMY color space. However, since the compact printer system allows for connectivity to PCs, it is quite reasonable to also allow highly accurate color matching between screen and printer to be performed on the PC. However the printer driver or PC program must output L*a*b*.

Each pixel of a compact printer image is therefore represented by 24 bits: 8 bits each of L*, a*, and b*. The total image size is therefore 1,361,700 bytes (850×534×3).

Each image processing module is able to access the image stored in the Printer Module. The access is either to read the image from the Printer Module, or to write a new image to the Printer Module.

The communications protocol for image access to the Printer Module provides a choice of internal image organization. Images can be accessed either as 850×534 or as 534×850. They can also be accessed in interleaved or planar format. When accessed as interleaved, each pixel in the image is read or written as 24 bits: 8 bits each of L*, a*, b*. When accessed as planar, each of the color planes can be read or written independently. The entire image of L* pixels, a* pixels or b* pixels can be read or written at a time.

The Effects Module 80 is an image processing module. It allows a user to select a number of effects and applies them to the current image in the Printer Module 10. The effects include borders, clip-art, captions, warps, color changes, and painting styles.

Figure 17:
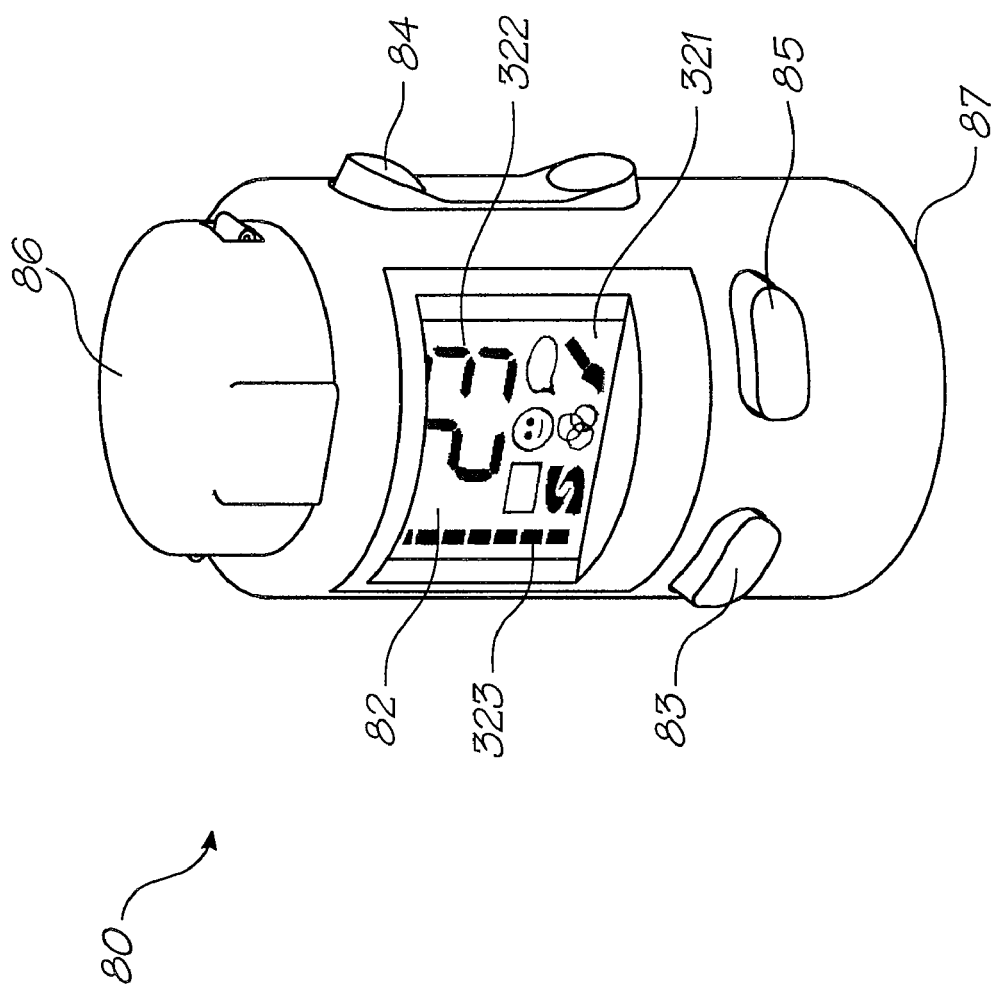
FIG. 17 is a perspective view of the effects module.

FIG. 17 shows a magnified perspective view of the Effects Module 80, as previously described with reference to FIG. 8. As shown in FIG. 17, the optional LCD 82 is showing all segments active. It is convenient to include the LCD in the module but as all data can be available on the serial bus it would be possible to configure a single LCD module that could display information from any module.

Figure 18:
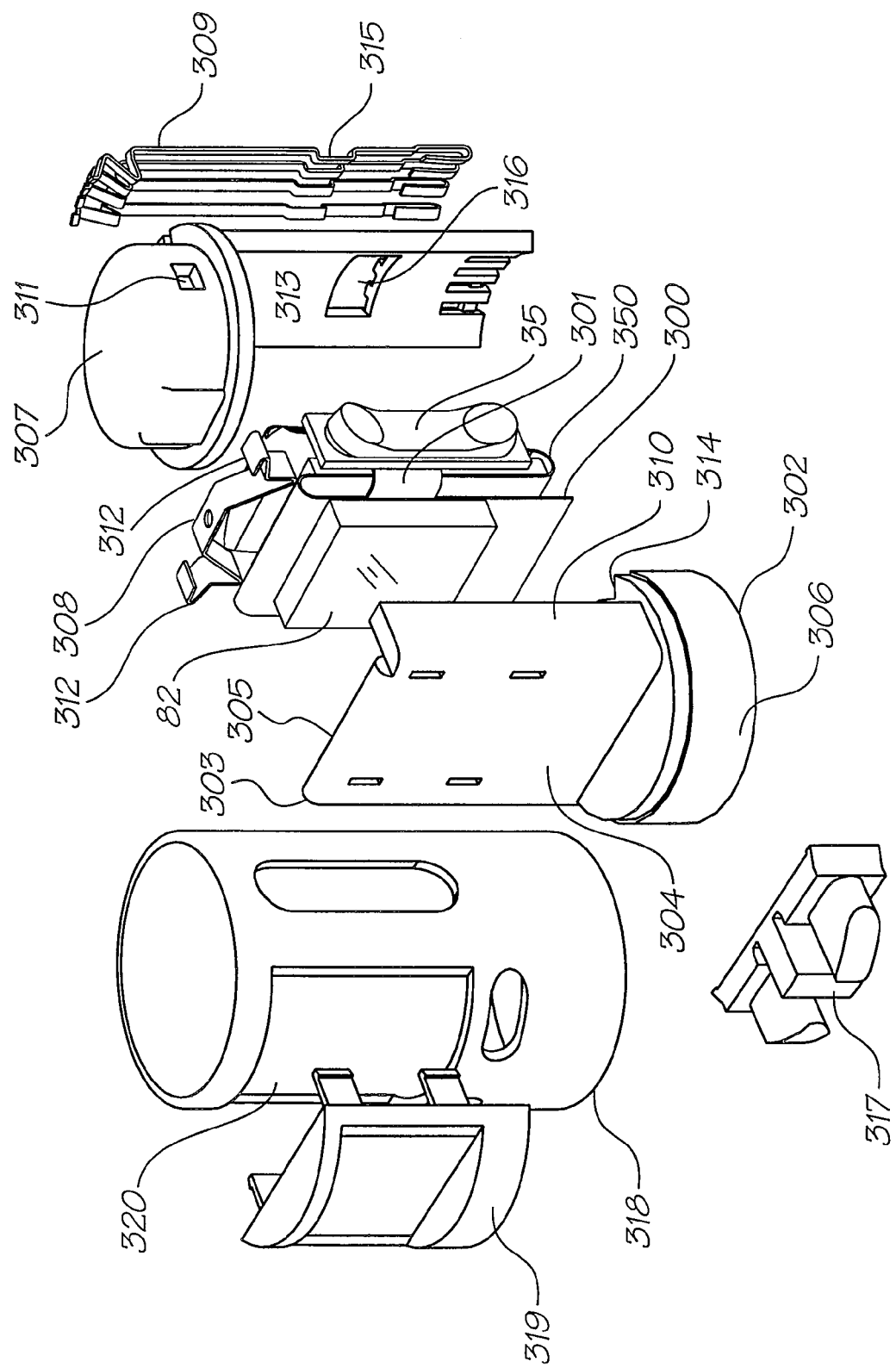
FIG. 18 is an exploded view of the effects module.

FIG. 18 shows an exploded view of the Effects Module 80. The Effects Module comprises a LCD 82 mounted on a flexible printed circuit board (PCB) 300. Also formed on the PCB 300 is an image processor that is suitably an application specific integrated circuit known as the Effects Module Central Processor (EMCP) 350.

The SELECT button 84 is a double button and operates in the manner of a known rocker switch to increment or decrement the effect number. Selections made using the SELECT button 84 are communicated to the PCB 300 via contact 301.

The flexible PCB 300 is mounted on a support 303 of chassis molding 302. In the preferred embodiment the PCB 300 is mounted such that the LCD 82 lies substantially parallel with a front face 304 of the support 303. The flexible PCB 300 passes over the support such that the EMCP 350 lies substantially parallel with a back face 305 of the support 303. The flexible PCB 300 passes under the EMCP and extends away from the base 306 of the chassis molding 302.

The contact 301 conforms to a curved edge of the support 303 allowing the base of SELECT button 84 to lie substantially parallel with a side face 310 of the support.

The male bayonet connector 86 comprises a cap molding 307, a latch strip 308 and a plurality of contact strips 309. The upper end of the cap molding is essentially dome-shaped and comprises two holes 311 positioned diametrically opposite each other. The holes 311 are positioned and shaped to receive the folded ends 312 of latch strip 308.

The lower end of the cap molding 307 comprises an elongated section 313 that is shaped to carry contact strips 309. The contact strips extend from the upper end of the cap molding, where they form part of the male connector 86, to the bottom of the elongated section 313. The bottom of the elongated section fits into a recess 314 in the base 306 of the chassis molding such that the contact strips 309 form part of the female bayonet connector 87.

Raised portions 315 of the contact strips 309 fit into an aperture 316 in the elongated section 313 of the cap molding. Contacts on the flexible PCB 300 mate with the raised portions 315 to make contact with the Serial Bus.

The CHOOSE button 83 and the APPLY button 85 are incorporated in a molding 317. A contact in the base of the molding for each button connects with the PCB 300 when one or other of the buttons is pressed.

The internal components of the Effects Module 80 are contained within a metal extrusion 318 that comprises a plurality of apertures. It is clear from FIG. 18 the manner in which the buttons 83, 84 and 85, and the male connector 86 protrude from the extrusion through the associated apertures to perform their function.

A fascia molding 319 clips into the aperture 320 and provides a protective cover for the LCD 82.

The Effects Module 80 connects to a compact printer configuration via the male connector 86 or the female connector 87. Either the male or the female bayonet connector joins the Effects Module to the Serial Bus via contact strips 309. Power may be provided to the Effects Module from the Printer Module 10 via the Serial Bus.

Alternatively, the Effects Module may be connected to a compact printer configuration via both the male and female bayonet connectors. An example of this principle is shown in FIG. 16 where the Memory Module 30 is connected via both its male and female connectors.

The Effects Module may be used to select an effect and then to apply that effect to the current image in the Printer Module 10 or in the Memory Module 30.

The LCD 82 provides feedback in the form of an effect type 321 and number 322, and an animated thermometer 323 that is shown while the effect is being applied to the image.

Pressing the CHOOSE button 83 cycles through the effect types. Each effect type has its own LCD icon and a current effect number. The effect types are borders, clip-art, captions, warps, color changes, and painting styles. These effects can be combined in any way and in any order.

Pressing the SELECT button 84 increments or decrements the effect number. The effect number is visible on the LCD screen. Ideally each effect type has 100 effects (although this is not strictly required). The Effects Module stores the current effect number for each effect type so that the next time the effect type is chosen, the previously used effect number is selected.

Once the desired effect type and effect number have been chosen, the effect can be applied to the image currently in the Printer Module 10 or Memory Module 30. This is done by pressing the APPLY button 85 below the LCD. As the image is being read, the effect applied, and resultant image written back, a series of animated segments appears on the left side of the LCD to form a thermometer-style status bar 323. The proportion of segments displayed is the proportion of the work that has been completed so far. The user knows that the effect has been applied once all the segments have been displayed.

Effects can also be applied to images external to the compact printer system. The Communications Module 40 allows the Effects Module 80 to be connected directly to a personal computer. The personal computer may then use the commands described above to command the Effects Module to apply a specific effect, or number of effects, to an image supplied from memory in the personal computer.

The user must consult a manual to determine the correspondence between effect and effect number.

To apply multiple effects to an image a user simply applies each effect one at a time. The order may be important if a specific end image is desired. For example, adding a border and then warping the image will produce a different result to warping the image followed by adding a border.

Image borders can range from simple white to elaborate and complex designs. Some borders incorporate the image, but the majority of borders and frames are straightforward, consisting of one image being overlaid over another.

Clip-art consist of photographic and stylized cartoon characters and images inserted into the image at a specific location. The characters and clip-art included in a general Effects Module would require little or no licensing. Examples include clowns, action figures, smiley faces, ugly faces, animals and specific objects.

Captions consist of speech bubbles, lines of text or other textual effects applied to an image. Examples include "Happy Birthday!", "How old are you?", "It was this big!", "Wow!", "Help!".

No effort is made to interpret the image before the caption is added. For a given effect number a specific caption is added at a specific fixed place in the image.

Captions are overlaid as graphics. Therefore they can include anything and be in any language, any color combination, and be in multiple fonts. The user is unable to change any part of the caption or style—the caption is simply added to the image. A choice between 100 captions is envisaged.

Images can be warped using the Warp effect type. Each warp effect number affects a fixed area of the image, which can be the entire image, or a limited part of the image. As with other effect modes, no effort is made to interpret the image before the warp is applied. For a given effect number, the specific warp is added at a specific fixed place in the image.

Some warps are specifically designed to affect a face image, although there is no specific face detection mechanism. Instead, the warp is applied to the part of the image where the face should be. For these warps, the effect is applied to the relevant part of the image irrespective of whether a face is present in that part of the image.

It is often desirable to transform an image in terms of color. Simple color effects include removal of color to produce a grey-scale image or a sepia tone image. More complex effects include exaggeration of certain colors, substitution of one color for another and the like.

The painting styles effect mode lets the user apply a painting style to an image. For example, an image can be changed into an impressionist drawing of the original, or drawn with a variety of brush strokes from a limited color palette. Painting styles also includes limited tiling effects.

These painting styles do not utilize lighting calculations. Certain types of metallic or bump-map based painting effects are therefore not possible.

Figure 19:
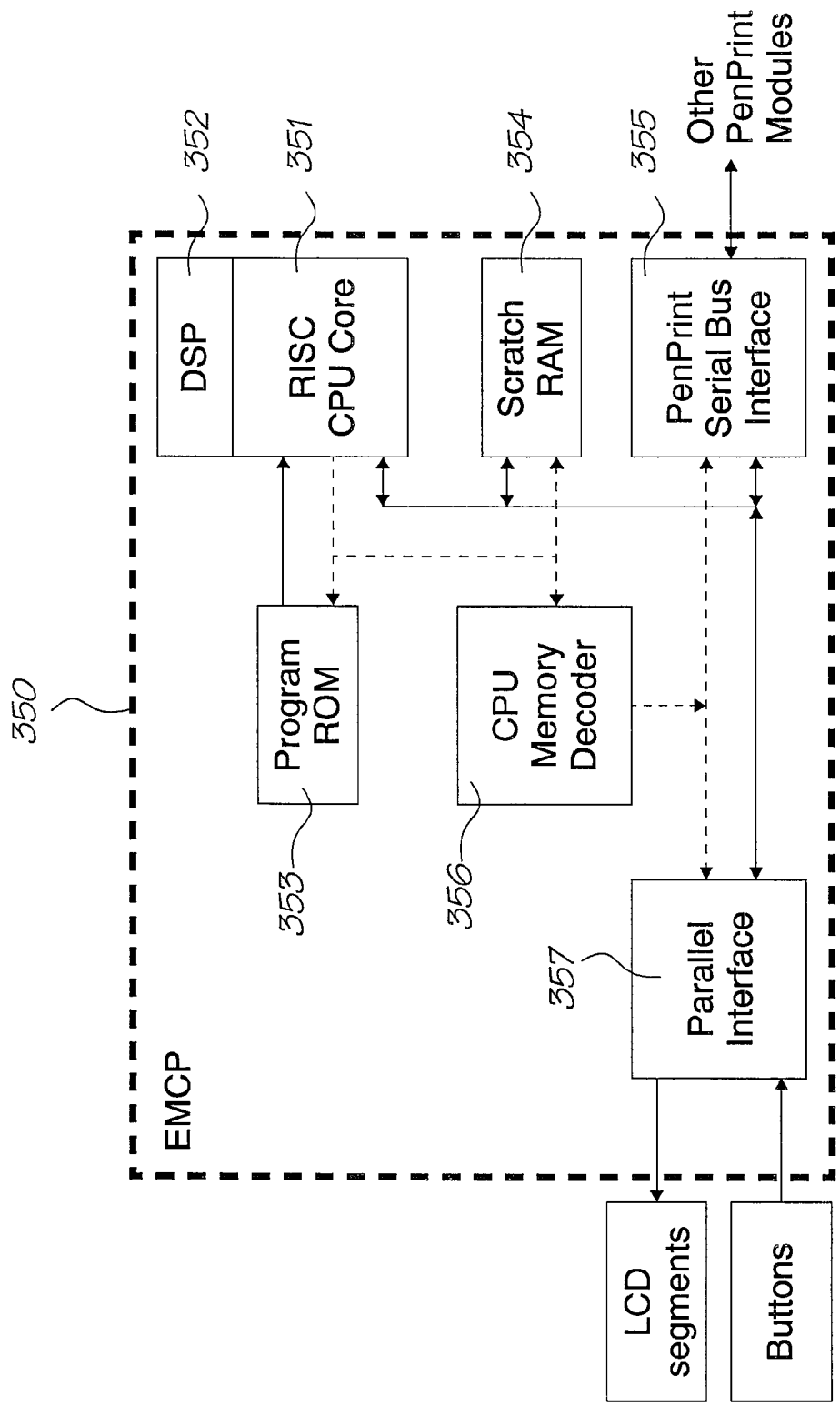
FIG. 19 is a block schematic diagram of a central processor chip for the effects module.

As mentioned above, an application specific integrated circuit (ASIC) may be configured as the Effects Module Central Processor (EMCP) 350. The elements of the EMCP 350 are shown in FIG. 19. The elements of the EMCP are described in detail in a co-pending application titled Effects Processor for Effects Module. It is envisaged that alternatives to an ASIC known in the art, such as a VLSI, may be used to configure the EMCP.

The EMCP 350 is a single chip containing a standard RISC processor core 351 with DSP 352 for fast integer multiplication and a small memory. The EMCP 350 includes a ROM 353 for software and data storage and RAM 354 for variable storage. Bus interface 355 communicates with the Serial Bus for transfer of an image to and from the Effects Module 80.

Also included in the EMCP is a memory decoder 356 and parallel interface 357 (that communicates with the LCD and various buttons).

EMCP need not contain memory for storing an image since the image is retrieved from an image source, has the effect applied and is returned to the image source. Nonetheless, local memory may be provided for image storage if desired.

The software running on the EMCP is a limited subset of the VARK language and a lookup table of VARK scripts as described in co-pending United States patent applications whose U.S. Ser. Nos. are as follows:

| USSN | Title |
|---|---|
| 6750901 | Digital Instant Printing Camera with Image Processing Capability |
| 6476863 | Image Transformation Means Including User Interface |
| 6894694 | Producing Automatic "Painting" Effects in Images |
| 6636216 | Digital Image Warping System |
| 6366693 | Digital Image Region Detection Method and Apparatus |
| 6329990 | Brush Stroke Palette Feedback Method for Automatic Digital "Painting" Effects |
| 6137500 | Utilizing of Brush Stroking Techniques in the Generation of Computer Images |
| 7050143 | Camera System with Computer Language Interpreter |
| 6486886 | Bump Map Compositing for Simulated Digital Painting Effects |
| 6381361 | METHOD FOR TRANSFORMING A GAMUT OF A COLOR IMAGE TO PRODUCE AN ARTISTIC EFFECT |
| 6317192 | Utilisation of Image Tiling Effects in Photographs |
| 6850274 | Image Texture Mapping Camera |
| 09/113054 | Utilisation of Image Illumination Effects in Photographs |

Since the effects are coupled with the VARK implementation, there is no specific future-proofing required.

The combination of the Effects Module 80 with the Printer Module 10 constitutes a minimum compact printer system that allows one or more effects to be applied to an image stored in the Printer Module and printed directly. The combination of the Memory Module 30 with a Camera Module 20 constitutes a digital imaging system. This combination allows an image captured by the Camera Module to be stored in the Memory Module.

Throughout the specification the aim has been to describe the preferred embodiments of the invention without limiting the invention to any one embodiment or specific collection of features. Persons skilled in the relevant art may realize variations from the specific embodiments that will nonetheless fall within the scope of the invention.

The invention claimed is:

1. An effects module for a modular printer, the effects module comprising:
 a body housing electronics;
 a CHOOSE actuator mounted on the body in electrical connection with the electronics and which enables a user to choose between a number of different types of effects to be applied to a stored image;
 a SELECT actuator mounted on the body in electrical connection with the electronics and which enables the user to select one of the effects; and
 an APPLY actuator mounted on the body in electrical connection with the electronics and which enables the user to apply the effect to the stored image.

2. An effects module as claimed in claim 1, wherein the actuators comprise respective button assemblies protruding from the body.

3. An effects module as claimed in claim 2, wherein the SELECT button assembly comprises a double button and operates in the manner of a rocker switch to serially scroll backwards and forwards through the effects.

4. An effects module as claimed in claim 1, wherein the electronics comprises a liquid crystal display (LCD) mounted in a window of the body.

5. An effects module as claimed in claim 4, wherein the CHOOSE and APPLY actuators are located in register with a display face of the LCD.

6. An effects module as claimed in claim 4, wherein the SELECT actuator is located laterally with respect to a display face of the LCD.

7. An effects module as claimed in claim 1, wherein the body has a male connector and female connector which allow the effects module to be connected to other modules of the modular printer.

\* \* \* \* \*